United States Patent [19]

Wu

[11] Patent Number: 4,994,366

[45] Date of Patent: Feb. 19, 1991

[54] SHRIMP ANALOG FORMING PROCESS

[75] Inventor: Ming C. Wu, Irvine, Calif.

[73] Assignee: JAC Creative Foods, Inc., Los Angeles, Calif.

[21] Appl. No.: 432,483

[22] Filed: Nov. 7, 1989

Related U.S. Application Data

[63] Continuation-in-part of Ser. No. 187,548, Apr. 28, 1988, abandoned.

[51] Int. Cl.[5] .......... A23L 1/325; A23L 1/33

[52] U.S. Cl. .......... 426/574; 426/643; 426/802

[58] Field of Search .......... 426/92, 104, 513, 574, 426/643, 656, 802, 657

[56] References Cited

U.S. PATENT DOCUMENTS

| | | | |
|---|---|---|---|
| 2,868,650 | 1/1959 | Hammerberg . | |
| 3,093,483 | 6/1963 | Ishler . | |
| 3,267,536 | 12/1966 | Ikeda et al. . | |
| 3,358,588 | 12/1967 | Rossnan | 426/513 X |
| 3,532,512 | 10/1970 | Joaquin . | |
| 3,615,686 | 10/1971 | Marshall . | |
| 3,684,527 | 8/1972 | Walter . | |
| 3,796,812 | 3/1974 | Baensch . | |
| 3,829,587 | 8/1974 | Tolstoguzov et al. | 426/350 |
| 3,852,484 | 12/1974 | Cabot | 426/104 |
| 3,852,487 | 12/1974 | Van Werven et al. | 426/388 |
| 3,863,017 | 1/1975 | Yueh | 426/376 |
| 3,870,808 | 3/1975 | Boyer | 426/250 |
| 3,881,032 | 4/1975 | Matsumoto et al. | 426/643 |
| 3,891,776 | 6/1975 | Carpenter et al. | 426/573 |
| 3,920,853 | 11/1975 | Middendorf et al. | 426/104 |
| 4,084,017 | 4/1978 | Kim et al. | 426/656 |
| 4,158,065 | 6/1979 | Sugino | 426/104 |
| 4,173,657 | 11/1979 | Gaudio et al. | 426/643 X |
| 4,181,749 | 1/1980 | Niki et al. | 426/643 X |
| 4,277,513 | 7/1981 | Rufer et al. | 426/656 |
| 4,285,980 | 8/1981 | Lewis | 426/249 |
| 4,301,181 | 11/1981 | Simon et al. | 426/250 |
| 4,303,008 | 12/1981 | Hice et al. | 426/513 X |
| 4,362,752 | 12/1982 | Sugino et al. | 426/574 X |
| 4,396,634 | 8/1983 | Shenouda et al. | 426/104 |
| 4,423,083 | 12/1983 | Shenouda | 426/574 |
| 4,427,704 | 1/1984 | Cheney et al. | 426/574 X |
| 4,464,404 | 8/1984 | Ueno et al. | 426/643 |
| 4,497,844 | 2/1985 | Hice et al. | 426/643 |
| 4,548,823 | 10/1985 | Morimoto | 426/104 |
| 4,554,166 | 11/1985 | Morimoto | 426/276 |
| 4,557,940 | 12/1985 | Suzuki | 426/513 |
| 4,559,236 | 12/1985 | Okada | 426/643 |
| 4,579,141 | 4/1986 | Hanson et al. | 426/104 X |
| 4,584,204 | 4/1986 | Nishimura et al. | 426/643 |
| 4,588,601 | 5/1986 | Maruyama et al. | 426/574 |
| 4,622,234 | 11/1986 | Okada | 426/643 |
| 4,652,455 | 3/1987 | Sugino et al. | 426/643 |
| 4,720,391 | 1/1988 | Kawana | 426/643 X |
| 4,853,239 | 8/1989 | Suzuki | 426/249 |
| 4,855,158 | 8/1989 | Kawana | 426/643 |
| 4,869,920 | 9/1989 | Okada | 426/643 |

FOREIGN PATENT DOCUMENTS

| | | | |
|---|---|---|---|
| 71678 | 1/1976 | Australia | 426/574 |
| 46-39059 | 11/1971 | Japan . | |
| 53-19058 | 7/1978 | Japan | 426/643 |
| 52-47948 | 4/1979 | Japan | 426/574 |
| 56-38187 | 9/1981 | Japan . | |
| 60-41469 | 3/1985 | Japan | 426/643 |
| 63-12269 | 5/1988 | Japan | 426/643 |
| 1518778 | 7/1978 | United Kingdom . | |

OTHER PUBLICATIONS

Mouri et al., "Method of Forming Coating Films and Food Product Coated With Them", Jap. Pat. Abst. 57-94279, 6-11-82.

Uchida et al., "Production of Konnyaku", Jap. Pat. Abst., 61-257156, 11-14-86.

*Primary Examiner*—Arthur L. Corbin

*Attorney, Agent, or Firm*—William W. Haefliger

[57] ABSTRACT

The preparation of a shrimp-like product, which includes: providing a surimi paste; providing an aqueous mixture B in paste form which contains both glucomannan and carrageenan, and protein and starch; forming a mixture C which contains the paste and the aqueous mixture B; extruding the mixture C to form an extrudate, cutting the extrudate to form pieces; and contacting the pieces with hot water for a time between 1 and 30 minutes to cook the pieces, and thereafter with cold water to thereby form gelled product pieces.

13 Claims, 1 Drawing Sheet

SHRIMP ANALOG FORMING PROCESS

BACKGROUND OF THE INVENTION

This application is a continuation-in-part of Ser. No. 187,548 filed Apr. 28, 1988, now abandoned.

This invention relates generally to fishmeat products, and more particularly, to a method for using surimi to produce simulated meat of a crustacean, such as small-size shrimp, known as "bay shrimp".

In the production of simulated bay shrimp, it is necessary to note a sensation of delicate crunchiness during chewing of this fishmeat; however, this is extremely difficult since surimi, from which the product is made lacks these textured qualities. Surimi itself is defined as minced fishmeat together with additives (for example, minced Alaska pollack mixed together with 4% [by weight] sugar, 4% [by weight] sorbitol, and 13% to 0.3% [by weight] sodium tripolyphosphate). Accordingly, a need exists to achieve this desired result.

SUMMARY OF THE INVENTION

It is a major object of the invention to provide a new method for producing simulated meat of a crustacean, meeting the above need.

It is another object of the invention to provide a method or process for forming a simulated, delicate, bay shrimp product, wherein a unique mixture is produced, containing surimi, glucomannan, carrageenan, starch, and protein, that mixture being extrudable under pressure, the extrudate being severable to form shrimp-like, small pieces which assume solid form with cooking in hot water, and with bay shrimp consistency and quality.

It is a further object of the invention to provide a unique method for producing a mixture B that is combinable with surimi paste to form the extrudable mixture C, the method including first forming a mixture A of water, glucomannan and carrageenan, wherein the glucomannan and the carrageenan constitute at least 5%, by weight, of the mixture A, and allowing the mixture A to hydrate to form a paste, and then adding and mixing $H_2O$, starch and protein to the hydrated mixture A to form the mixture B which is in thick paste form.

As will be seen, as the resultant final mix is extruded, as in C-shaped, cross-section form, the advancing extrudate is repeatedly cut as by a rotating knife or cutter, to form C-shaped, shrimp-like pieces that fall into a hot, aqueous bath for cooking followed by solidification in cold water, to produce the product. In this regard, the glucomannan (mannose and glucose in high molecular weight form) in the konjaku flour ingredient produces heat-induced gelation, thickening of the paste to be extruded, as by interaction with starch, and pH stability; and the carrageenan (typically Kappa carrageenan) also aids gelation. The gel strength of the cut pieces being cooked in the hot water bath (between 50° and 100° C.) increases, without affecting the elasticity of the gel, and cold water treatment of the pieces after such cooking achieves the final gelled product texture. The gel therefor is regarded as thermally reversible. Cutting of the extrudate into small, product-size pieces prior to aqueous cooking minimizes the time required for completed gelation.

DRAWING DESCRIPTION

DETAILED DESCRIPTION

Figure 1:
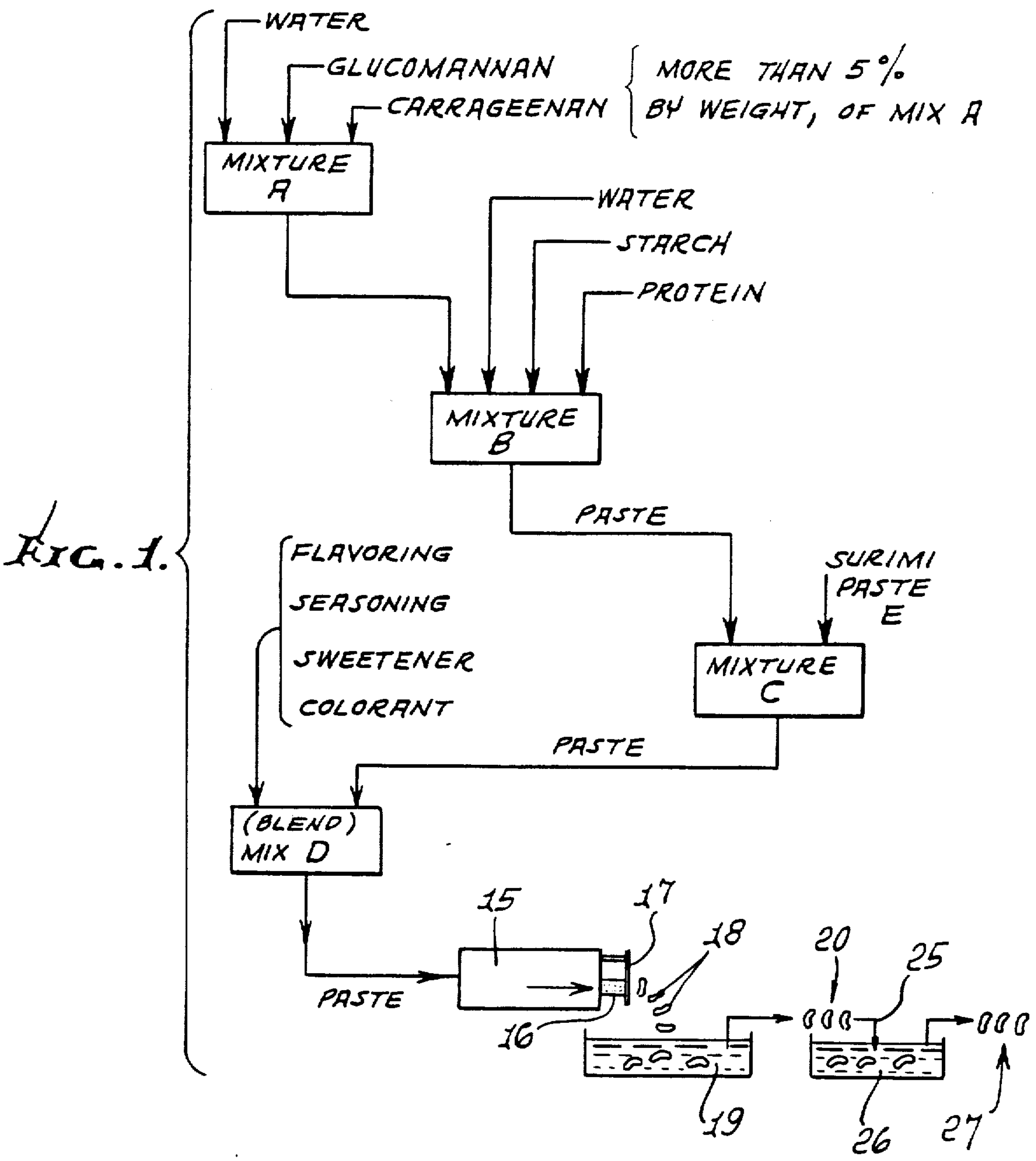
FIG. 1 is a flow diagram.

Referring first to FIG. 1, the method of forming simulated shrimp pieces or product includes: providing surimi paste, as at E; providing an aqueous mixture B in paste form which contains both glucomannan and carrageenan, and also protein and starch; forming a mixture C which contains both the surimi paste and also the paste mixture B; then extruding the mixture C to form an extrudate, and cutting the extrudate to form pieces; providing a hot water bath; and contacting the cut pieces of the extrudate with hot water for a time between 1 minute and 30 minutes, providing a cold water bath; and contacting the cooked pieces with cold water to cool them, thereby to form gelled product pieces. Prior to cold water treatment, the pieces are not sufficiently gel stabilized, i.e., have a certain softness, as with a paste-like consistency, that consistency being removed by cold water treatment to produce stabilized strong pieces with harder texture. Typically, the mixture C is blended with additives, such as sweeteners, crustacean flavoring, seasoning (salt), and a colorant to form a paste mixture D which is then extruded at 15 to form a C-shaped cross-section extrudate 16; and the latter is cut by a cutter 17 rotating at a cyclic speed to form small, shrimp-like pieces 18 between ½ inch and 1.5 inch overall length, the pieces dropping into a hot water bath 19 wherein the pieces remain for between 1 and 30 minutes. The bath temperature is between 50° and 100° C. Product pieces 20 are removed from the bath, and dropped or lowered at 25 into a cold water bath 26 (water temperature between 34° and 40° F.) to cool them over a time interval to lower their temperature to about 70°-80° F. Completed gelling is thereby achieved as the cooled pieces are removed at 27.

In the above, surimi paste at E is obtained by pulverizing cleaned and rinsed fishmeat, as for example Alaska pollack, to produce extrudable surimi.

The mixture B is formed typically by first forming a pre-mixture A of water, glucomannan and carrageenan, wherein the ingredient relative amounts are:

| | |
|---|---|
| water | 100 weight parts |
| glucomannan (konjaku flour) | 3-20 weight parts |
| carrageenan (powder) | 1-20 weight parts |

Konjaku flour or yam flour derives from the mechanical processing of the tubers of Amorphophallus rivieri Dur. This mass or mixture A is initially watery, but is allowed to hydrate with mixing (4-6 minutes) to form a thick paste, at ambient temperatures. The glucomannan and carrageenan constitute at least 5%, by weight, of the mix. The pH is about 7.0. To this mix is added water, starch and protein, in the following proportions to form mixture B:

| | | |
|---|---|---|
| water | 5-20 | weight parts |
| starch | 0.5-5 | weight parts |
| protein | 0.2-5 | weight parts |

Mixture B is also a thick paste, of pH about 7.0. The starch or modified starch typically consists of wheat, corn or potato starch; and the protein consists of egg white powder, or soy protein, or whey protein, or beef blood plasma, or gluten.

Mixture C is then formed by adding 5 to 100 weight parts of surimi paste to mixture B, mixture C being an extrudable paste combination.

Figure 2:
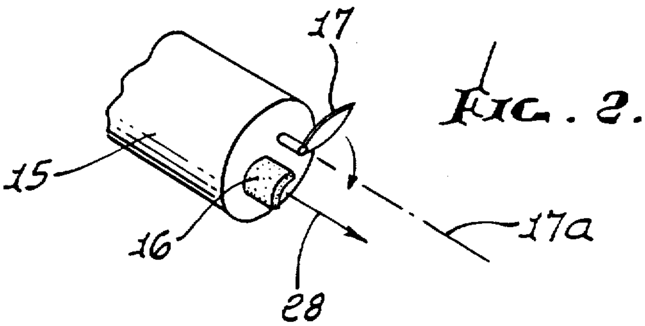
FIG. 2 is a view showing extruding and cutting.

In FIG. 2, the cutter 17 rotates about axis 17*a*, at a rate which determines the thickness of the product pieces 18. Axis 17*a* is parallel to the extrusion direction 28 of extrudate 16.

I claim:

1. In the preparation of a shrimp-like product, the steps comprising:

(a) providing a minced fishmeat surimi paste, (b) providing an aqueous mixture B in paste form which contains both glucomannan and carrageenan, protein and starch, said mixture B being formed by first forming a mixture A of water, glucomannan and carrageenan, wherein the glucomannan and the carrageenan constitute at least 5%, by weight, of the mixture A, and allowing said mixture A to hydrate to form a paste, and then adding and mixing $H_2O$, starch and protein to the hydrated mixture A to form said mixture B which is in thick paste form, (c) forming a mixture C which contains said minced fishmeat paste and said aqueous mixture B, (d) extruding said mixture C to form an extrudate, and cutting said extrudate to form pieces of a length between ½ inch and 1½ inches, (e) contacting said pieces with hot water in a bath at between 50° and 100° C. for a time between 1 and 30 minutes, to cook the pieces, (f) and then contacting said cooked pieces with cold water in a bath at between about 34° F. and 40° F., wherein the pieces are therein cooled to between about 70° and 80° F., and then removing the cooled pieces from the cold bath in gelled condition to form gelled product pieces.

2. The method of claim 1 wherein said extruding step and cutting step are carried out to form said pieces with C-shape, generally shrimp-like.

3. The method of claim 1 wherein said mixture B contains relative weight parts as follows:

105–125 wt. parts of $H_2O$

3–20 wt. parts of glucomannan 1.20 wt. parts of carrageenan.

4. The method of claim 3 wherein said mixture B contains relative weight parts as follows:

0.5–5 wt. parts of starch 0.2–5 wt. parts of protein.

5. The method of claim 1 wherein said mixture A contains, relatively, 100 parts $H_2O$, by weight; 3 to 20 parts, by weight, glucomannan; and 1 to 20 parts, by weight, carrageenan.

6. The method of claim 1 wherein said mixture B contains relative weight parts as follows:

0.5–5 wt. parts of starch 0.2–5 wt. parts of protein.

7. The method of claim 6 wherein said mixture B contains between 105 and 125 weight parts $H_2O$.

8. The method of claim 5 wherein said mixture B contains relative weight parts as follows:

0.5–5 wt. parts of starch 0.2–5 wt. parts of protein.

9. The method of claim 8 wherein said mixture B contains between 105 and 125 weight parts $H_2O$.

10. The method of claim 1 wherein said extrudate travels in direction X, and said cutting is carried out by providing a knife, and rotating the knife about an axis that also extends in direction X.

11. The method of claim 10 including controlling the angular rate of rotation of the knife to control the thickness of said product pieces.

12. The product pieces produced by the method of claim 11.

13. The product pieces produced by the method of claim 1.

* * * * *